United States Patent [19]

Yamada et al.

[11] Patent Number: 4,961,990
[45] Date of Patent: Oct. 9, 1990

[54] FIBROUS MATERIAL FOR COMPOSITE MATERIALS, FIBER-REINFORCED COMPOSITE MATERIALS PRODUCED THEREFROM, AND PROCESS FOR PRODUCING SAME

[75] Inventors: Senichi Yamada; Shinichi Towata; Hajime Ikuno, all of Aichi; Takemi Yamamura, Yamaguchi; Toshihiro Ishikawa, Yamaguchi; Masaki Shibuya, Yamaguchi, all of Japan

[73] Assignees: Kabushiki Kaisha Toyota Chuo Kenkyusho; Ube Industries, Ltd., both of Japan

[21] Appl. No.: 61,548

[22] Filed: Jun. 15, 1987

[30] Foreign Application Priority Data

Jun. 17, 1986 [JP] Japan .................. 61-139297
Mar. 11, 1987 [JP] Japan .................. 62-55823
Apr. 6, 1987 [JP] Japan .................. 62-84324
Apr. 20, 1987 [JP] Japan .................. 62-96889
Apr. 24, 1987 [JP] Japan .................. 62-101277

[51] Int. Cl.$^5$ ............................ B32B 5/16
[52] U.S. Cl. .......................... 428/240; 428/224; 428/226; 428/232; 428/283; 428/297; 428/323; 428/367; 428/294; 428/402; 428/408; 428/902; 501/95
[58] Field of Search .......... 428/257, 283, 297, 298, 428/325, 328, 329, 367, 408, 902, 292, 293, 294, 226, 240, 323, 224, 232; 501/95

[56] References Cited

U.S. PATENT DOCUMENTS

| 4,399,232 | 8/1983 | Yajima et al. | 501/38 |
| 4,732,779 | 3/1988 | Towata | 427/57 |
| 4,752,503 | 6/1988 | Thebault | 427/248.1 |
| 4,874,661 | 10/1989 | Browne et al. | 428/294 |

FOREIGN PATENT DOCUMENTS

| 0055076 | 6/1982 | European Pat. Off. |
| 0170396 | 2/1986 | European Pat. Off. |
| 59-74247 | 4/1984 | Japan |
| 61-91341 | 5/1986 | Japan |

Primary Examiner—James J. Bell
Attorney, Agent, or Firm—Oliff & Berridge

[57] ABSTRACT

A fiber and fibrous material for producing composite materials, fiber-reinforced metals, fiber-reinforced plastics and fiber-reinforced ceramics, in which short fibers, whiskers or powders made of heat resistant material are deposited on continuous fibers made of heat resistant material.

The composite materials, such as fiber-reinforced metals, plastics, and ceramics, contain the fibrous material in a matrix, and have improved control of the fiber volume ratio and mechanical characteristics. Processes for producing the fiber, fibrous materials and composite materials are also disclosed.

14 Claims, 4 Drawing Sheets

FIBROUS MATERIAL FOR COMPOSITE MATERIALS, FIBER-REINFORCED COMPOSITE MATERIALS PRODUCED THEREFROM, AND PROCESS FOR PRODUCING SAME

FIELD OF THE INVENTION

This invention relates to a fibrous material for composite materials, fiber-reinforced metals (FRM), fiber-reinforced plastics (FRP) and fiber-reinforced ceramics (FRC), as well as processes for producing them.

BACKGROUND OF THE INVENTION

Various composite materials such as fiber-reinforced metals (FRM) produced by reinforcing metals with fibers have recently come into general use for various machine parts and structural members. Although reinforcement fibers for FRM and the like are not easily wet by a matrix metal, especially an aluminum alloy or magnesium alloy, once wet, the reinforcement fibers react with the matrix and undergo degradation. Accordingly, surface treatment is generally applied to the reinforcement fibers, including, for example, a chemical vapor deposition method and a plating method, by which the reinforcement fibers are coated with metals or ceramics in the form of a thin uniform film at the surfaces thereof. However, these methods have various drawbacks. For example, the thin film can peel off due to the difference between the coefficients of thermal expansion for the reinforcement fibers and the matrix, thus reducing the effect of the surface treatment. In addition, if the coating film is made thicker, the reinforcement fibers lose their flexibility, become rigid and brittle, and are easily damaged. Furthermore, a complex apparatus is required for the surface treatment of individual fibers, undesirably increasing the cost of production. Moreover, if FRM is produced by the squeeze casting method, the fiber distribution tends to be uneven and to have coarse and dense portions. This makes it difficult to control the fiber volume fraction (Vf) in FRM. Especially, when the Vf is small, it undesirably restricts the degree of freedom available for the materials design, which is an advantageous feature of FRM or the like containing uniformly dispersed reinforcement fibers.

For overcoming such disadvantages, the combined use of continuous fibers or long fibers with short fibers and/or whiskers as the reinforcement fibers for use in composite materials has been proposed. For example, a method is known using long fibers to form the inside part and short fibers to form the outside part of FRM, as well as a method of preparing a prepreg for FRM by pressure-forming a mixture of long and short fibers.

However, the method requiring separation of long fibers and short fibers in the component complicates the production step for FRM or the like, and the strength of the materials is unsatisfactory. In the method using a mixture of long fibers and short fibers in preparing a prepreg, although short fibers can be applied to the surface of the bundle of long fibers, it is difficult to uniformly deposit the short fibers on the surfaces of the individual long fibers in the inside of the bundle thereby reducing the uniformity of the fibrous material obtained.

For overcoming the problems described above, the present inventors have previously proposed a method of depositing short fibers, whiskers or powders to the surface of individual fibers by dipping a bundle of continuous fibers into a liquid containing the short fibers, whiskers or powders suspended therein (U.S. patent application Ser. No. 865,293, now U.S. Pat. No. 4,732,779). Although this method is excellent for the preparation of FRM, it has been found as the result of further study that the method is not always completely successful, depending on conditions such as the composition of the matrix in the FRM. For example, when using ordinary continuous fibers, a method is still sought for obtaining satisfactory strength in the axial direction of the fiber in FRM materials, fatigue strength in FRP materials, and heat resistance in FRC materials.

The problem remains that the continuous fibers are not uniformly dispersed to an extent sufficient for practical use, and the volume fraction of the fibers cannot be controlled over a wide range, preventing a satisfactory improvement in mechanical properties such as strength.

SUMMARY OF THE INVENTION

One object of the invention is an inorganic fiber for use in composite materials having improved wettability with metals, ceramics or plastics used as a matrix.

A second object of the invention is an inorganic fiber for use in composite materials that can be uniformly dispersed in a composite material having a controlled volume fraction of fiber.

A further object of the invention is an inorganic fiber-reinforced composite material having improved mechanical properties.

Another object of the present invention is a fiber for use in composite materials having reduced thermal stress between the continuous fiber and matrix.

An additional object of the invention is an inorganic fiber-reinforced composite metal material having improved strength, a controlled volume fraction, and uniform dispersion of the continuous fibers in the composite material.

Yet another object of the invention is an inorganic fiber-reinforced composite ceramic material having improved heat resistance.

A still further object of the invention is a fiber-reinforced composite plastic material having improved fatigue strength.

Further objects of the invention relate to processes for producing such inorganic fibers, inorganic fiber-reinforced composite metal materials, inorganic fiber-reinforced composite plastic materials and inorganic fiber-reinforced composite ceramic materials.

It has now been found that these and another objects of the present invention can be attained by an inorganic fiber for a composite material comprising: (a) a continuous inorganic fiber comprising a composition of silicon, carbon, oxygen and titanium or zirconium selected from
(i) an amorphous material substantially comprising Si, M, C and O;
(ii) a composition substantially comprising: at least one crystalline particles mixture selected from
  (a) $\beta$-SiC, MC and a solid solution of $\beta$-SiC and MC,
  (b) $\beta$-SiC, MC, and $MC_{1-x}$, and
  (c) $\beta$-SiC, MC, a solid solution of $\beta$-SiC and MC, and $MC_{1-x}$, each having a grain size of less than about 500 Å; amorphous $SiO_2$; and amorphous $MO_2$; and
(iii) a mixture of said amorphous material (i) and said composition (ii)
  wherein M represents Ti or Zr, and x is a number greater than 0 and smaller than 1; and (b) at least one of short fibers, whiskers and fine particles comprising heat-resistant material deposited on said continuous inorganic fibers.

In a further aspect, the present invention relates to a fibrous material for use in composite materials composed of a bundle of continuous fibers or a woven fabric made of the bundle of continuous fibers having fine particles, and short fibers and/or whiskers deposited on the individual surfaces of the continuous fibers in which the continuous fibers are composed of a ceramic, carbon or a metal; and the fine particles, short fibers and whiskers are composed of a ceramic, carbon or a metal.

The invention also relates to composite materials containing these fiber materials and processes for producing the materials and composite materials.

DETAILED DESCRIPTION OF THE INVENTION

Figure 1:
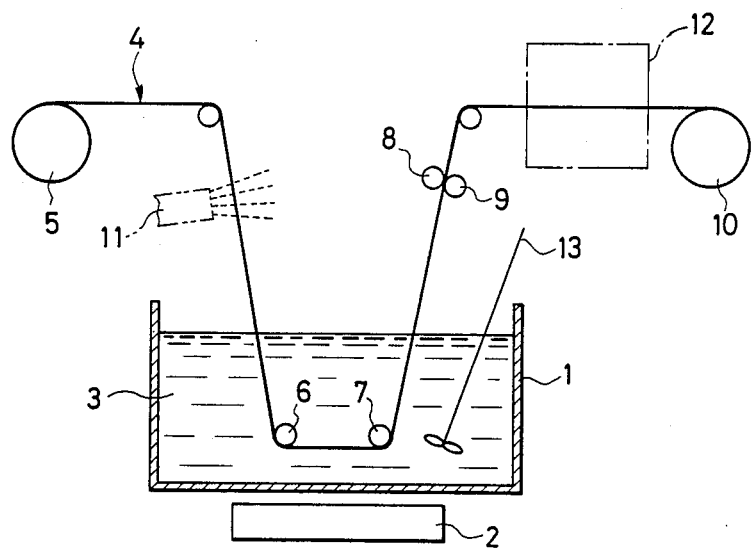
FIG. 1 depicts an apparatus used in the process for producing the fibrous material for use in composite materials according to the invention.

The continuous inorganic fiber composed of silicon, titanium or zirconium, carbon and oxygen used in the inorganic fiber according to the invention generally has the following composition:
Si: 30–60 wt %,
Ti or Zr: 0.5–35 wt %,
C: 25–40 wt % and
O: 0.01–30 wt %.
Preferably the Ti or Zr content is from 1 to 10 wt %.

The diameter and the cross-sectional shape of the fibers are not unduly limited and can easily be selected depending on the intended use of the fibers in a composite material.

The continuous inorganic fibers can be prepared by various processes, including, for example, the following method described in U.S. Pat. Nos. 4,342,712 and 4,515,742.

Suitable inorganic fibers substantially composed of Si, Ti or Zr, C and O can be produced by a following method.

Firstly, a polycarbosilane is reacted with a polymetallosiloxane to provide a crosslinked organic metal polymer.

Suitable polycarbosilanes have a number average molecular weight of about 500 to 10,000, and a main skeleton predominantly made up of structural units of the formula

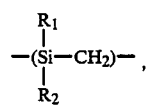

in which $R_1$ and $R_2$, which may be the same or different, each represents a hydrogen atom, a lower alkyl group or a phenyl group.

Useful polymetallosiloxanes have a number average molecular weight of about 500 to 10,000, and a main skeleton predominantly made up of metalloxane bonding units —(M—O)— where M represents Ti or Zr, and siloxane bonding units

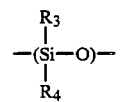

where $R_3$ and $R_4$, which may be the same or different, each represents a hydrogen atom, a lower alkyl group, or a phenyl group, in which the ratio of the total number of the metalloxane bonding units to the total number of the siloxane bonding units is within a range of from about 30:1 to 1:30, the siloxane bonding units have at least one side chain lower alkyl group or phenyl group, and the metal atoms in the metalloxane bonding units have at least one lower alkyl side chain group.

These two components are mixed in amounts such that the ratio of the total number of the structural units

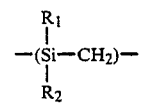

of the polycarbosilane to the total number of the bonding units —(M—O)— of the polymetallosiloxane is within a range of from about 100:1 to 1:100. The mixture is heated in an organic solvent under an atmosphere inert to the reaction, to bond at least a portion of the silicon atoms in the polycarbosilane with at least a portion of silicon atoms and/or metal atoms of the polymetallosiloxane by way of oxygen atoms. An organic metal polymer with a number average molecular weight of about 1,000 to 50,000 is produced, having crosslinked polycarbosilane portion and a polymetallosiloxane portion.

Secondly, a spinning solution of the polymer is prepared and spun in any conventional manner, to produce continuous fibers that are then cured with or without tension.

Finally, the cured fibers are then heat-treated in a vacuum or an inert gas atmosphere at a temperature within a range of about 800° to 1,800° C., to produce the continuous inorganic fibers according to the invention.

As an alternative process, inorganic fibers substantially composed of Si, Ti or Zr, C and O can be prepared by a following method.

Firstly, a polycarbosilane is reacted with an organic metal compound to provide a crosslinked organic metal polymer.

Suitable polycarbosilanes have a number average molecular weight of from about 200 to 10,000, and a main skeleton made up of structural units represented by the formula:

$$-(Si-CH_2)-$$
with $R_1$ and $R_2$ as substituents on Si.

where $R_1$ and $R_2$, which may be the same or different, each represents a hydrogen atom, a lower alkyl group or a phenyl group. Suitable organic metal compounds are represented by the formula:

$$MX_4$$

where M represents Ti or Zr and X represents an alkoxy group containing 1 to 20 carbon atoms, a phenoxy group or acetyl acetoxy group. These two components are mixed in an amounts such that the total number of the structural units $-(Si-CH_2)-$ of the polycarbosilane to the total number of metal-oxygen bonds of the organic metal compound is within a range of from about 2:1 to 200:1. The mixture is reacted by heating in an atmosphere inert to the reaction, under conditions sufficient to bond at least a portion of the silicon atoms in the polycarbosilane with the metal atoms of the organic metal compound by means of oxygen atoms, thereby forming an organic metal polymer with a number average molecular weight of about 700 to 100,000.

Secondly, a spinning solution of the organic metal polymer is prepared and spun into continuous fibers, which are then cured with or without tension.

Finally, the cured fibers are heat-treated in vacuum or an inert gas atmosphere at a temperature within a range of from about 800° to 1,800° C., to prepare continuous inorganic fibers for use in the present invention.

These inorganic fibers preferably have an average diameter of from 2 to 30 μm, and more preferably from 6 to 20 μm.

In the present invention, the continuous inorganic fibers have deposited on their surfaces at least one of short fibers, whiskers and powders made of a heat-resistant material.

The term "heat-resistant material" as used herein is not particularly limited, and includes, for example, ceramics such as heat treated products containing any of silicon carbide, silicon nitride, boron nitride, aluminum nitride, alumina, silica and polymetallocarbosilane; heat-resistant non-metallic elements such as carbon and boron; and heat-resistant metals or alloys such as steel, stainless steel and tungsten.

Of these materials, the heat-treated products of the polymetallocarbosilanes include the materials of which the above continuous inorganic fibers are made; i.e., the short fibers may have any compositions set forth above for the continuous fibers.

The diameter and shape of the particles contained in the fine powder can be suitably selected based on the diameter of the continuous fibers.

The length, diameter and cross-sectional shape of the short fibers or whiskers may be selected based on factors such as the average grain size of the fine particles, the type of continuous inorganic fiber employed, and the desired properties of the composite fiber-reinforced material.

The continuous inorganic fibers can be used as they are by monoaxially or polyaxially orientating the fibers into bundles, or by fabricating them into various types of woven fabrics such as plain fabrics, satin fabrics, mosha fabrics, twill elastic fabrics, hollow fabrics, leno fabrics, helical fabrics and 3-dimensional fabrics.

Generally, in bundles or woven fabrics it is preferred that the short fibers or whiskers have an average diameter of about 1/3,000 to 1/5 of the average diameter of the continuous fibers and a length-to-diameter ratio of from about 50 to 1,000, and that the fine particles of the powder have an average diameter of about 1/5,000 to ½ of the average diameter of the continuous fibers.

The amounts of the powder, short fibers and whiskers deposited on the continuous fibers vary widely depending on their properties, and the intended application of the fibrous material. In a fiber-reinforced metal, for example, the ratio of the total volume of the short fibers, whiskers and fine particles to the volume of the continuous fibers is preferably from about 0.1 to 500%.

In bundles or fabrics, it is desirable that the ratio to the fine particles and the short fibers and/or whiskers is within a range of from 1:50 to 40:1 by volume ratio.

A sizing agent may optionally be used in this invention, including known sizing agents for inorganic fibers, e.q., polyethylene oxide, polystyrene, polymethylene, polyvinyl alcohol and epoxy resin. The ratio of the volume of the sizing agent to the total volume of the continuous fibers and the short fibers, whisker or powders made of heat-resistant material is preferably from about 0.5 to 50% by volume.

Another aspect of the invention relates to a fibrous material useful for composite materials, made up of a bundle or fabric of continuous heat-resistant fibers having fine particles, short fibers and/or whiskers of a heat resistant material deposited on the surfaces of the continuous heat-resistant fibers. Although the continuous heat-resistant fibers in this embodiment of the invention may be the continuous inorganic fiber described above, the heat-resistant fiber is not so limited, and includes any fiber made of a heat-resistant material including ceramics, carbon and metals.

In the fibrous material of the invention, it is preferred that fine particles are mainly deposited (preferably, about 80% of them) on the surface of continuous heat-resistant fiber and that short fibers and/or whiskers are mainly deposited (preferably, about 80% of them) on the outside of said fine particles. Fibrous materials are also preferred in which the average grain size of the fine particles is less than about 1-30 of the average length of the short fibers and/or whiskers. It is preferred that the ceramic heat-resistant material contain at least one carbide, nitride, boride and oxide, and more preferred that the ceramic has the same composition as the continuous inorganic fiber, i.e., the silicon, titanium or zirconium, carbon and oxygen composition set forth above.

There is no specific restriction for the process used to deposit the powder, short fibers and whiskers to the fiber, bundle or fabric according to the invention and it is possible to use any conventional method, including, for example, electrodeposition, fluidizing bed, blowing and dipping in a suspension. The method of dipping the fibers, bundles or fabrics in a liquid suspension of the powders, short fibers or whiskers can suitably be adopted in view of its simplicity and general applicability.

For example, continuous inorganic fibers or a bundle of continuous heat-resistant fibers unwound from a bobbin, or woven fabrics of such continuous fibers, can be dipped into a liquid containing at least one of short fibers, whiskers or powders suspended therein, in order to deposit the short fibers, whiskers or powders on the surface of the continuous inorganic fibers or individual fibers in the fabrics.

In the bundle of fibers or fabrics thus treated, the fine particles, short fibers or whiskers are deposited on the surface of the individual fibers. While a single processing bath containing one processing liquid may be used, it is also possible to use two or more processing baths containing processing liquids of different compositions if desired.

When depositing the fine particles, short fibers and/or whiskers on the surface of continuous fibers of a bundled or woven fibrous material, it is possible to use a single processing liquid containing fine particles, short fibers and/or whiskers suspended together, and it is also possible to use two processing baths, one containing fine particles suspended therein and the other containing short fibers and/or whiskers suspended therein. When using two baths, the bundle of continuous fibers or woven fabric may be dipped in any desired order, that is, first in the processing liquid containing the fine particles suspended therein or first in the processing liquid containing the short fibers and/or whiskers suspended therein.

In a preferred embodiment of the fibrous material according to the invention, a bundle of continuous fibers or woven fabric in which fine particles are mainly deposited on the surface of the continuous fibers and short fibers and/or whiskers are mainly deposited on the outside of said fine particles can be produced by first dipping a bundle of continuous fibers or woven fabric in a processing liquid containing the fine particles suspended therein, and then dipping the bundle or fabric into another processing liquid containing the short fibers and/or whiskers suspended therein. In this method, the fine particles at first penetrate the bundle of continuous fibers and are deposited on the surface of individual fibers. The gap between the fibers is thus widened to facilitate the subsequent penetration of the short fibers and/or whiskers into the continuous fiber bundle.

Alternatively, a bundle of continuous fibers or woven fabric may be dipped into a processing liquid containing both short fibers and/or whiskers and fine particles having an average particle size of less than about 1/30 of the average length of the short fibers and/or whiskers suspended therein. In this case, the fine particles predominantly first penetrate into the gaps between the fibers, being deposited on the surface of the fibers to widen the gap between them, thus facilitating the penetration of the short fibers and/or whiskers into the gap between the fibers.

Further, if desired, deposition can be made more uniform for each of the fibers by applying ultrasonic vibration to the suspension. The ultrasonic process is particularly effective when dipping a bundle of continuous fibers or woven fabric into a suspension of powders, short fibers or whiskers. The ultrasonic method is not particularly limited, and ultrasonic vibrations may be applied by an ultrasonic applicator disposed on the outside of a vessel containing the processing liquid, or ultrasonic vibrators, for example, ceramic vibrators, may be provided in an appropriate number in the processing liquid. The ultrasonic waves may be applied either in continuously in a pulsed pattern. The intensity, frequency and duration of ultrasound may properly be selected depending on the kinds of continuous fibers, the type of short fibers, whiskers or fine particles to be deposited, as well as processing conditions such as the concentration of the deposits in the liquid, the dipping time of the continuous fibers or fiber bundles, etc. For instance, frequencies from about 10 kHz to 2,000 kHz suitably can be used.

Although water may be used as the liquid for suspending the powders, short fibers or whiskers to be deposited, if a sizing agent is coated on the surface of the continuous fibers, a surface active agent or solvent for the sizing agent is preferably used. For instance, an organic solvent such as ethanol, methanol or acetone, and particularly ethanol, is effective since it dries rapidly due to its higher volatility as compared with that of water, reducing production time. Further, a mixture of the organic solvent described above with water may be used. There is no specific restriction on the concentration of the particulates in the processing liquid, either when using a plurality of processing liquids each containing one substance to be deposited suspended therein, or when using a single processing liquid containing two or more such substances suspended therein. However, a uniform deposit is not obtained on the continuous fiber if the concentration is too low, and the amount deposited is undesirably increased if the concentration is too high. Generally, when processing a bundle of continuous fibers such as a yarn containing 6,000 fibers to deposit silicon carbide whiskers of 0.3 $\mu$m average diameter and fine silicon carbide particles of 0.3 $\mu$m average particle size, it is suitable to adjust the concentration of the deposits in a range of about 0.5 g/l to 80 g/l.

The dipping time can be controlled by any conventional means such as a movable roll. If desired, the bundle of treated continuous fibers may be dried before wound on a bobbin by means of a drying furnace, an infrared drier or a hot air flow drier. Further, to the settling of short fibers or fine particles during processing, a stirrer or other suitable agitation means may be used, or gas may be blown through the coating bath.

When using a sizing agent, the whiskers, short fibers or fine particles may be deposited on the continuous fibers after the continuous fibers have been treated with the sizing agent, or the sizing agent may be dissolved or dispersed in the suspension of the whiskers, short fibers or fine particles and both of them may be applied at the same time to the continuous fibers.

Commercially available products may be used as the continuous inorganic fibers, continuous heat-resistant fibers, various powders and short fibers or whiskers required in the invention.

The fibrous material of the invention, either in the form of a bundle or woven fabric, can be used to produce a fiber-reinforced metal composite material (hereinafter referred to as an "FRM"), a fiber-reinforced plastic composite material (hereinafter referred to as an "FRP") and a fiber-reinforced ceramic composite material (hereinafer referred to as an "FRC"). Typically in such materials, the bundles or fabrics according to the invention are surrounded by a matrix, including a metal matrix, a plastic matrix, or a ceramic matrix, respectively.

Examples of suitable metal matrices include aluminum, magnesium and alloys thereof.

Ceramic matrices include, for example, carbide ceramics such as silicon carbide, titanium carbide, zirconium carbide, vanadium carbide, niobium carbide, tantalum carbide, boron carbide, chrominum carbide, tungsten carbide, molybdenum carbide and graphite; nitride ceramics such as silicon nitride, titanium nitride, zirconium nitride, vanadium nitride, niobium nitride, tantalum nitride, boron nitride, aluminum nitride and hafnium nitride; oxide ceramics such as alumina, silica, magnesia, mullite and cordierite; and glass ceramics such as borosilicate glass, high silica content glass and aluminosilicate glass.

Specific examples of the plastic matrices include epoxy resins, modified epoxy resins, polyester resins, polyimide resins, phenol resins, polyurethane resins, polyamide resins, polycarbonate resins, silicon resins, phenoxy resins, polyphenylene sulfide resins, fluoro resins, hydrocarbon resins, halogen-containing resins, acrylic acid type resins, ABS resins, super high molecular weight polyethylenes, modified polyphenylene oxides and polystyrenes, copolymerized polyesters and polyethers.

In such composite materials, it is generally preferred to use a fibrous material in which the volume ratio of the fine particles, short fibers and/or whiskers to the continuous fibers is from about 0.1 to 500%. In the composite material, the continous fibers occupy 10 to 70% of the total volume.

Fiber-reinforced metal composite materials according to the invention can be prepared by any known methods, such as melt infiltration process (vacuum infiltration procedure casting or squeeze casting). For example, squeeze casting process is expected as a mass-production process of FRM. In the squeeze casting process, A( melt is infiltrated into fiber preform by high pressure (about 50 MPa to 200 MPa).

Fiber-reinforced plastic composite materials according to the invention can be prepared by any known methods, such as a hand lay-up method, a matched metal die method, a breakaway method, a filament winding method, a hot pressing method, an autoclave method and a continuous drawing method. For example, in the hot pressing method, the fibrous material, as a bundle or woven fabric, is impregnated with plastics and subjected to preliminary curing to prepare a prepreg sheet, which is when laminated and heated under pressure in a hot press to form a plate-like composite material.

In producing fiber-reinforced ceramic materials according to the invention, a binder can optionally be used such as a binder for sintering the ceramic matrix at a high density, including those used for sintering carbide, nitride, boride and glass ceramics. The binder for sintering silicon carbide can include, for example, boron, carbon and boron carbide, while the binder for sintering silicon nitride can include, for example, alumina, magnesia, yttria and aluminum nitride. A binder for improving the bondability of the powdery ceramic matrix and the inorganic fibers can be used, including organic silicon polymers such as diphenyl siloxane, dimethylsiloxane, polyborodiphenylsiloxane, polyborodimethylsiloxane, polycarbosilane, polydimethylsilazane, polytitanocarbosilane and polyzirconocarbosilane, as well as organic silicon compound such as diphenylsilanediyl and hexamethyldisilazane.

The amount of the binder used is generally from about 0.5 to 20% by weight of the matrix composition.

The fiber-reinforced composite ceramic material according to this invention can be manufactured by integrating the fibrous material and the matrix, using any conventional method.

Various methods are known for producing an assembly of the powdery ceramic matrix and the reinforcement fibers, and the assembly can be efficiently produced by embedding the fibers in a powdery ceramic matrix or a kneaded mixture containing ceramic and binder, by alternatively disposing reinforcement fibers and the powdery ceramic matrix or the kneaded product, or by first disposing the reinforcement fibers and then filling the gaps therebetween with the powdery matrix or the kneaded product. Such an assembly may be sintered by any convenient known method, such as by press-molding the assembly using a rubber press, mold press or the like under a pressure of about 50 to 5,000 kg/cm$^2$ followed by sintering in a heating furnace at a temperature within a range of from bout 600° to 2,400° C., or by sintering while hot pressing at a temperature of from about 800° to 2,400° C. and a pressure of about 30 to 5,000 kg/cm$^2$.

The sintering can be conducted in vacuum, or under an atmosphere comprising an inert gas such as nitrogen, argon, carbon monoxide and hydrogen.

The thus-obtained fiber-reinforced composite ceramic material can be further treated to produce a higher density sintered product, by applying the following treatment at least once. The sintered product is first dipped under a reduced pressure into a molten solution of an organic silicon compound or an organic silicon polymer or, as required, in a solution in which the compound or the polymer is dissolved in an organic solvent, to impregnate the molten liquid or solution into the grain boundaries and into the pores of the sintered product. The sintered product after impregnation is heated to a temperature of from about 800° to 2,500° C. in vacuum or under an atmosphere comprising an inert gas selected from nitrogen, argon, carbon monoxide and hydrogen, to produce a higher density fiber-reinforced ceramic composite product.

Fibrous material according to another aspect of the present invention in which the fibrous material comprises a bundle or fabic of continuous heat-resistant fibers having fine particles and short fibers and/or whiskers of a heat-resistant material deposited on the surfaces of the continuous feat-resistant fibers, inorganic fiber-reinforced composite metal material using such fibrous material, inorganic fiber-reinforced composite plastic material using such fibrous material, and inorganic fiber-reinforced composite ceramic mateiral using such fibrous material can include, for example, those described below as preferred embodiments:

(1) Fibrous material in which fine particles are mainly deposited on the surfaces of continuous heat-resistant fiber and short fibers and/or whiskers are mainly deposited on the outside of said fine particles.

(2) Fibrous materials in which the average grain size of the fine particles is less than about 1/30 of the average length of the short fibers and/or whiskers.

(3) Fibrous material in which ceramic heat-resistant material comprises
(i) an amorphous material substantially comprising Si, M, C, and O;
(ii) a composition substantially comprising: at least one crystalline particles mixture selected from
 (a) $\beta$-SiC, MC and a solid solution of $\beta$-SiC and MC,
 (b) $\beta$-SiC, MC, and $MC_{1-x}$, and
 (c) $\beta$-SiC, MC, a solid solution of $\beta$-SiC and MC, and $MC_{1-x}$, each having a grain size of less than about 500 Å; amorphous $SiO_2$; and amorphous $MO_2$; and
(iii) a mixture of said amorphous material (i) and said composition (ii)
wherein M represents Ti or Zr and x is a number greater than 0 and smaller than 1.

Further, the composite metal, plastic, and ceramic materials according to the present ivention can include, for example, those described below as preferred embodiments:

(5) A composite mateiral containing the fibrous matirial as described in (3) above in which the carbide is silicon carbide, the nitride is silicon nitride, and the oxide is alumina.

(6) A composite material in which the volume ratio of the fine particles and short fibers and/or whiskers relative to the continuous fibers is from 0.1 to 500%.

(7) A composite material in which the blending ratio of the continuous fibers based on the composite material is from 10 to 70% by volume.

Further, the inorganic fiber-reinforced composite plastic material according to the present ivention can include those described below as preferred embodiment:

(8) A composite material in which the plastics as a matrix for the composite material are selected from the group consisting of an epoxy resin, a modified epoxy resin, a polyester resin, a polyimide resin, a phenol resin, a polyurethane resin, a polyamide resin, a polycarbonate resin, a silicone resin, a phenoxy resin, a polyphenylene resin, a fluoro resin, a hydrocarbon resin, a halogen-containing resin, an acrylic acid type resin, an ABS resin, a copolymerized polyester, and a copolymerized polyether.

Further, the inorganic fiber-reinforced composite ceramic material according to the present invention can include, for example, those described below as the preferred embodiment:

(9) The composite material in which the ceramics as a matrix for the composite material are carbide ceramics such as silicon carbide, titanium carbide, zirconium carbide, vanadium carbide, niobium carbide, tantalum carbide, boron carbide, chromium carbide, tungsten carbide, molybdenum carbide, and graphite; nitride ceramics such as silicon nitride, titanium nitride, zirconium nitride, vanadium nitride, niobium nitride, tantalum nitride, boron nitride, aluminum nitride, and hafnium nitride; oxide ceramics such as alumina, silica, magnesia, mullite, and cordierite; or glass ceramics such as borosilicate glass, high silica content glass, and aluminosilicate glass.

The production process for the fibrous material according to the present ivention in which the fibrous material comprises a bundle or fablic of continuous heat-resistant fibers having fine particles and short fibers and/or whiskers of a heat-resistant material deposited on the surfaces of the continuous feat-resistant fibers, as well as production processes for the composite metal, plastic, and ceramic materials containing such fibrous material according to the present ivention can include, for example, those described below as preferred embodiment:

(10) A process in which fine particles are mainly deposited on the surface of continuous heat-resistant fiber and short fibers and/or whiskers are mainly deposited on the outside of said fine particles.

(11) A process in which the ceramic heat-resistant material contains at least one carbides, nitrides, borides, and oxides.

(12) A process in which the ceramic heat-resistant material comprises
(i) an amorphous material substantially comprising Si, M, C, and O,
(ii) a composition substantially comprising: at least one crystalline particles mixture selected from
 (a) $\beta$-SiC, MC and a solid solution of $\beta$-SiC and MC,
 (b) $\beta$-SiC, MC, and $MC_{1-x}$, and
 (c) $\beta$-SiC, MC, a solid solution of $\beta$-SiC and MC, and $MC_{1-x}$, each having a grain size of less than about 500 Å; amorphous $SiO_2$; and amorphous $MO_2$; and
(iii) a mixture of said amorphous material (i) and said composition (ii)
wherein M represents Ti or Zr and x is a number greater than 0 and smaller than 1.

(13) A process for applying ultrasonic vibrations to the processing liquid.

(14) A process for using one processing bath containing the processing liquid.

(15) A process as defined in (14) above, in which the average grain size of the fine particles is less than about 1/30 of the average length of the short fibers and/or whiskers are deposited on the outside thereof.

(16) A process of using 2 or more processing baths containing the processing liquid.

(17) A process as defined in (16) above, which comprises dipping a bundle of continuous fibers or woven fablics made therefrom into a processing liquid containing fine particles suspended therein, then dipping them into another processing liquid containing short fibers and/or whiskers suspended therein and mainly depositing fine particles on the surface of the continuous fibers and mainly depositing short fibers and/or whiskers on the outside of said fine particles.

The invention will now be described in greater detail by reference to specific embodiments thereof in the following examples, but the invention is not be construed as being in any way limited to the specific examples provided. Unless otherwise indicated, all parts, percents and ratios are by weight.

EXAMPLE 1

Preparation of Continuous Inorganic Fibers (I)

Into a 5 liter three-necked flask, 2.5 liters of anhydrous xylene and 400 g of metallic sodium were placed and heated to the boiling point of xylene under a nitrogen gas stream, while one liter of dimethyldichlorosilane was added dropwise for one hour. After the addition was completed, the mixture was heated to reflux for 10 hours (148° C.) to form precipitates. The precipitates were filtered and washed with methanol and then with water to obtain 420 g of polydimethylsilane (number average molecular weight: 1,200) as white powder.

Separately, 750 g of diphenyldichlorosilane and 124 g of boric acid were heated in n-butyl ether under a nitrogen gas atmosphere at a temperature of from 100° to 120° C., and the resultant white resinous product was dried and further heated in vacuum at 400° C. for one hour to obtain 530 g of polyborodiphenylsiloxane (number average molecular weight: 1,100).

Then, 8.27 g of the polyborodiphenylsiloxane as described above was admixed with 250 g of the polydimethylsiloxane and polymerized in a 2 liter volume quartz pipe equipped with a reflux column by heating at 350° C. under a nitrogen gas stream for 6 hours to obtain a polycarbosilane, and then, after cooling to room temperature, the product was dissolved in xylene, and, after the xylene was evaporated off, was concentrated at 320° C. for one hour under a nitrogen gas stream to obtain 140 g of solids.

40.0 g of the resultant polycarbosilane and 7.3 g of titanium tetrabutoxide were weighed and 300 ml of xylene was added to the mixture to form a mixed solution of uniform phase, which was reacted under reflux in a nitrogen gas atmosphere at 130° C. for one hour with stirring. After the reflux reaction was ended, the temperature was further increased to 230° C. to distill off the xylene solvent, and then polymerization was conducted in the liquid phase at 230° C. for one hour to obtain polytitanocarbosilane (number average molecular weight: 2,100). The polytitanocarbosilane was heated to melt at 210° C. using a spinning apparatus and spun while molten from a spinnelet of 15 $\mu$m diameter at a spinning rate of 400 m/min in air to obtain continuous fibers.

Then, the spun fibers cured in the air at 190° C. for 2 hours and then heat-treated in nitrogen at 1,300° C., for 1 hour to obtain continuous inorganic fibers (I) (diameter 10 $\mu$m) mainly composed of Si, Ti, C and O, having a Ti content of 3% by weight. The fibers contained both amorphous material composed of Si, Ti, C and O, and a composition containing amorphous $SiO_2$ and $TiO_2$, and $\beta$-SiC, TiC, a solid solution of $\beta$-SiC and TiC, and $TiC_{1-x}$ ($0<x<1$) each having a grain size of 50 Å. The film had a tensile strength of 320 kg/mm$^2$ and a modulus of elasticity of 18t/mm$^2$.

Preparation of Continuous Inorganic Fibers (II)

A polyzirconocarbosilane was prepared in the same manner as above except that 10 g of zirconium ethoxide use added as the organometallic component to 80 g of polycarbosilane obtained in the same manner as above. The polymer was dissolved in benzene, melt-spun, subjected to curing treatment in air at 170° C. for 2 hours and subsequently heat-treated in nitrogen at 1,200° C., for 1 hour to obtain amorphous continuous inorganic fibers (II) consisting of silicon, zirconium, carbon and oxygen with a zirconium content of 4.5% by weight. The fiber had a diameter of 10 $\mu$m, a tensile strength of 350 kg/mm$^2$ and a modulus of elasticity of 18 t/mm$^2$.

Preparation of Inorganic Fibers for Use in Composite Materials

After charging 5 g of silicon carbide whiskers (0.2 $\mu$m in average diameter and 100 $\mu$m in average length) into a processing bath containing 1 liter of ethanol, ultrasonic sound (frequency 28 KHz) was applied to the bath, thereby forming a uniform liquid suspension of the whiskers.

A bundle of inorganic fibers (I) (i.e., an 800 filament yarn having a diameter of 11 $\mu$m) was unwound from a bobbin, dipped in the liquid suspension while controlling the dipping time to about 14 seconds by movable rollers and, after being pressed by press rollers, was wound onto a bobbin and dried at room temperature in atmospheric air. Whiskers were deposited in an amount of 0.03 g per 10 m of the inorganic fiber bundle.

The thus-treated fiber bundle was cut into 150 mm lengths, and 50 bundles were inserted side-by-side into a 160 mm length pipe made of steel. The pipe was pre-heated in a nitrogen gas atmosphere to 760° C., and then placed in a casting die, and of pure molten aluminum heated to 760° C. was poured into the fiber bundle. The fiber-metal mass was pressed at 500 kg/cm$^2$ for 60 seconds using a punch, and solidified to produce a fiber-reinforced metal (Material 1 according to the invention).

A cross section of the metal composite structure perpendicular to the axis of the continuous fibers was examined by using a scanning electron microscope, and it was found that silicon carbide whiskers were present in the spaces between the inorganic fibers, and that they were uniformly dispersed in the matrix metal. The inorganic fibers were dispersed in the composite material without contacting each other.

The same procedure described above use repeated except for using together 5 g of the silicon carbide whiskers used for the production of Material 1 and 5 g of silicon nitride whiskers (average diameter 0.3 $\mu$m, average length 200 $\mu$m), and increasing the dipping time to 20 seconds. The amount of the whiskers deposited was 0.03 g per 10 cm of the fiber bundle.

The thus-treated fiber bundle was cut into 150 mm lengths, and 100 such bundles were inserted side-by-side into a pipe made of steel. The pipe was pre-heated in a nitrogen gas atmosphere at 720° C. and then placed in a casting mold, and pure molten aluminum heated to 720° C. was poured into the fiber materials. The matrix-fiber mass was pressed at 750 kg/cm$^2$ for 60 seconds using a punch to obtain a FRM sample having the same dimensions as Material 1. The solidified fiber-reinforced metal produced is referred to as the Material 2 of the invention.

Upon examining a cross section of the composite metal structure perpendicular to the axis of the continuous fibers using a scanning electron microscope, it was found that silicon carbide whiskers were present in the spaces between the inorganic fibers and that they were uniformly dispersed in the matrix metal. In this sample, the inorganic fibers were dispersed in the composite material without contacting each other.

Measurement of Bending Strength

The inorganic fiber-reinforced composite metal materials 1 and 2 of the invention had a bending strength 2 to 5 times larger than that of a composite metal material produced in the same manner except using the whiskers.

EXAMPLE 2

After charging 50 g of silicon carbide fine particles (0.3 $\mu$m in average diameter) into a processing bath containing 1 liter of ethanol, ultrasonic vibrations were applied to suspend them, thereby forming a liquid suspension.

A bundle of the inorganic fibers (I) (800 filament yarn) as used in Example 1 was unwound from a bobbin, dipped in the liquid suspension while controlling the dipping time to about 15 seconds by movable rolls and, after pressing by press rolls, wound up to a bobbin and dried at room temperature in atmosphere. The silicon carbide fine particles were deposited on the inorganic fiber bundle in an amount of 0.03 g per 10 m of the inorganic fiber bundle.

The thus treated fiber bundle was cut into 150 mm length, gathered by 50 bundles and then inserted into a pipe made of steels. The pipe was pre-heated in a nitrogen gas atmosphere at 760° C., and then placed in a casting die to which molten Al-4% Cu alloy heated to 760° C. was poured. They were pressed at 900 kg/cm$^2$ for 60 seconds using a punch.

The composite material (fiber-reinforced metal) of the inorganic fiber bundle and Al-4% Cu alloy was prepared in the same manner as above except that the silicon carbide particles were not deposited.

Further, the fiber-reinforced metals (FRM) having the silicon carbide fine particles deposited on the fibers and not having the particles were prepared in the same manners as above except for using silicon carbide fibers (average diameter: 15 μm) in place of the inorganic fibers (I).

Further more, the fiber-reinforced metals (FRM) having the silicon carbide fine particles deposited on the fibers and not having the particles were prepared in the same manner as above except for using alumina fibers average diameter: 17 μm) in place of the inorganic fibers (I).

The bending strength in the vertical direction of the fiber axis ($\sigma_L$) of each FRM obtained is shown in Table 1 below.

TABLE 1

| Type of FRM | Bending Strength ($\sigma$ L) (kg/mm$^2$) |
|---|---|
| Inorganic fiber (I) (70%)/Al-4% Cu | 40 |
| Inorganic fiber (I) (50%)/Al-4% Cu SiC particle (4%) | 100 |
| Silicon Carbide fiber (55%)/Al-4.5% Cu | 70 |
| Silicon carbide fiber (46%) SiC particle (4%)/Al-4.5% Cu | 100 |
| Alumina fiber (50%)/Al-4% Cu | 55 |
| Alumina fiber (50%) SiC particle (3%)/Al-4% Cu | 70 |

It is apparent from Table 1 above that where the inorganic fiber (I) of the invention is used, the $\sigma_L$ is greatly improved as compared to the use of other fibers.

EXAMPLE 3

FIG. 1 shows a production apparatus used in the process according to the invention. After pouring 100 g of silicon carbide whiskers (about 0.2 μm in average diameter, about 100 μm in average length) and 250 g of fine silicon carbide particles (0.28 μm) average grain diameter) in to a processing bath containing 500 cc of ethanol, ultrasonic sound (28 Hz) was applied to both using ultrasonic source 2, producing a suspension of the solid additions in processing solution 3. A bundle of continuous fibers 4, i.e., carbon fiber bundle HM 35 manufactured by Toho Rayon (fiber diameter 7 μm), containing 6,000 fibers, with a sizing agent) was unwound from bobbin 5 and dipped and passed through the processing liquid while adjusting the dipping time to 15 seconds by movable rollers 6 and 7. At the same time, ultrasonic sound was applied to the processing liquid 3, while air was blown into the bath to provide additional agitation. Then, the fibers were compressed by press rollers 8 and 9, wound up on a bobbin 10 and dried at room temperature in atmospheric air. In the drawing, 11 denotes a blower, and 12 denotes a drying furnace, which may be used as desired, and 13 is an agitator.

The fibers, which were black before the treatment, became green-grey after the processing and, as a result of electron microscope (SEM) observation, it was determined that the fine particles from the bath were predominantly deposited on the surface of continuous fibers and whiskers were predominantly deposited on the outside thereof.

As a result of weighing after the processing, it was calculated that fine particles and whiskers having a total volume equal to 10% by the volume of the carbon continuous fibers were deposited.

EXAMPLE 4

Continuous alumina fibers (diameter 17 μm) were coated using the same procedures as in Example 3, except that the silicon carbide whiskers were replaced by 100 g of silicon nitride whiskers (average diameter of about 0.3 μm, average length of about 200 μm), and 100 g of fine silicon carbide particles (diameter 17 μm) suspended in 5,000 cc of water. The total volume of fine particles and whiskers deposited was about 5% of the volume of the alumina fibers.

EXAMPLE 5

After continuously dipping the inorganic fibers (I) into a suspension in which 100 g of fine silicon carbide particles (diameter 0.28 μm) were agitated and suspended in 500 cc of ethanol, using ultrasonic sound (28 Hz), they were subsequently dipped using the same procedures in a suspension of 150 g of silicon nitride whiskers (length 200 μm, diameter 0.3 μm) stirred in 500 cc of ethanol, and then dried. Fine particles and whiskers having a total volume of about 14% of the volume of the inorganic fibers (I) were deposited.

EXAMPLE 6

Upon conducting the same procedures under the same conditions as in Example 5 using fabrics manufactured by plainly weaving 500 yarns of silicon carbide fibers (diameter 15 μm) instead of the bundle of the inorganic fibers (I), the woven fabric which was black before treatment became grey-green in the woven fabrics it was determined that fine particles were predominantly deposited on the surface of individual fibers and, further, that whiskers were predominantly deposited on the outside thereof. As the result of weighing, it was found that the total volume of whiskers and fine particles deposited was 18% of the volume of the silicon carbide fibers.

Figure 2:
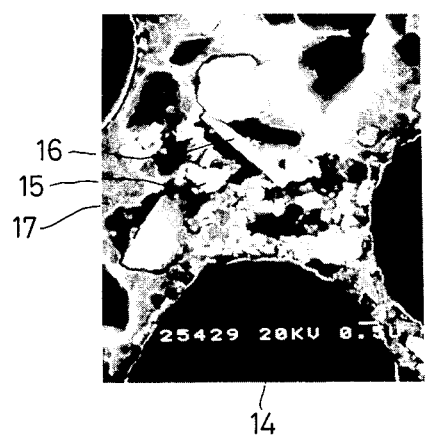
FIG. 2 is an electron micrograph showing the metal structure of an FRM containing the fibrous material according to the invention.

FIG. 2 is an electron micrograph of the composite structure in one example of an FRM composite containing a fibrous material according to this invention. Since the fiber gaps between the continuous fibers 14 of the FRM were properly maintained due to the deposition of the fine particles 15 and the whiskers 16 etc. on their surfaces, they were uniformly dispersed in the matrix metal 17 and contact between the continuous fibers was reduced in comparison with fibers in the absence of such deposition. It was also determined that in the case of a carbon fiber/aluminum composite material, while the bending strength in the direction perpendicular to the axis of the fibers for the material without deposition was 2 kg/mm$^2$, it was remarkably improved to 10 kg/mm$^2$ for similar products containing the same fiber and matrix in a fibrous material according to the invention, in which fine silicon carbide particles (diameter 0.28 μm) were deposited and silicon carbide whiskers (diameter 0.2 μm; length 50 μm) were deposited on the outside thereof.

Figure 3:
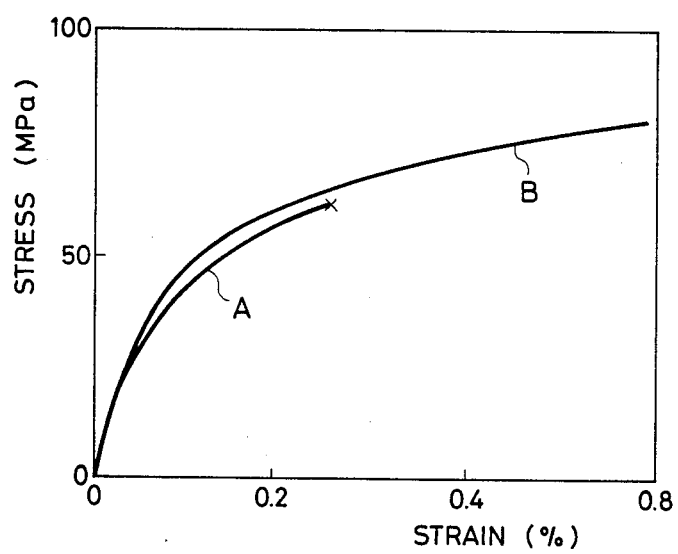
FIG. 3 is a graph comparing the tensile stresses and strains in the direction perpendicular to the fibers of an FRM containing the fibrous material according to the invention with those in a conventional FRM.

FIG. 3 shows the result of a tensile test made in a direction perpendicular to the bundle of SiC fibers used as continuous fibers. In FIG. 3, A indicates the result of the conventional FRM, and B indicates the result of the FRM according to the invention. Although the strength of the conventional FRM containing only the continuous fibers, i.e., without deposited fine particles or whiskers, was substantially identical with that of the matrix metal, the FRM containing the fibrous material according to the invention, prepared by codepositing fine particles and whiskers on the bundle, had a strength as high as 1.5 times of that of the matrix metal. While strain at break was 0.2% in the conventional FRM, a large plastic deformation occurred in the invention FRM and the strain at break was more than 1.2%. In each sample pure Al was used as the matrix metal.

Figure 4:
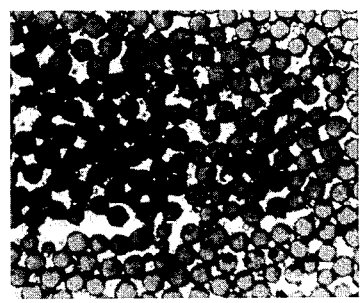
FIG. 4 is an optical micrograph showing the microstructure of an FRM containing fine SiC particles.
Figure 5:
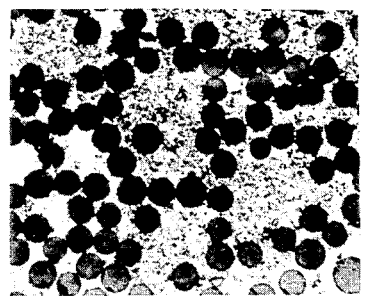
FIG. 5 is an optical micrograph showing the microstructure of an FRM containing fine SiC whiskers.
Figure 6:
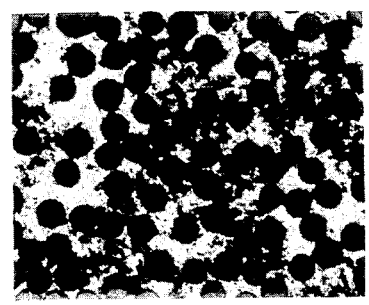
FIG. 6 is an optical micrograph depicting the microstructure of an FRM containing both fine SiC particles and SiC whiskers.

FIGS. 4 through 6 are the optical micrographs showing for the composite structures of three FRM's. The composition of the FRM in FIG. 4 is (the inorganic fiber (I)+fine SiC particle/95% Al/5% Ni), the composition of FRM in FIG. 5 is (the inorganic fiber (I)+SiC whisker/95% Al/5% Ni) and the composition of FRM in FIG. 6 is (the inorganic fiber (I)+fine SiC particle+SiC whisker/95% Al/5% Ni).

As can be seen in FIG. 4, when only the fine particles are deposited on the surfaces of the continuous fibers, although contact between the fibers can be prevented, the fibers tend to bunch into a region of relatively high density, making it difficult to control the volume fraction of the fibers by enlarging the space between fibers. Further, when adding only the whiskers or short fibers as shown in FIG. 5, it is difficult to completely prevent the fibers from contacting each other. However, as shown in FIG. 6, when both fine particles and whiskers are deposited on the surface of the continuous fibers, thereby preventing the fibers from contacting each other, the control of the volume ratio of fibers in the FRM is facilitated and the fiber distribution is uniform.

More specifically, when using only the fine particles, although the fiber gaps are increased, the elements added to the matrix metal tend to contact the continuous fibers and degrade them. Further, when using only the whiskers and/or short fibers, although the additive elements do not easily contact the surface of the fibers, the fiber gaps are insufficient and partial contact is observed between continuous fibers. Further, although the fiber volume fraction could be controlled only within a range from about 60 to 70% in the absence of deposition, it can be established within a range from about 10 to 70% in the fibrous material according to the invention, by varying the amount of the fine particles or whiskers deposited.

In FRM materials commonly used, Al alloys are used as the matrix metal, in which Al is typically combined with Cu, Si, Mg, or Zn. Although these additives are highly useful in improving the properties of the matrix metal, they often undesirably contribute to the shearing of continuous fibers reinforcing the FRM, for the following reasons.

(i) They form a eutectic product, which joins the fibers to each other to reduce the strength of the FRM.
(ii) They react with the fibers to reduce the strength thereof.
(iii) They form compounds reducing the toughness of the matrix. Although reduction in the toughness may cause no problem in an Al alloy alone, it may cause a remarkable reduction in the toughness of an FRM containing the alloy.

Figure 7:
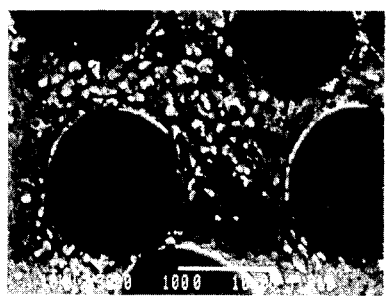
FIG. 7 is an electron micrograph illustrating the micro-structure of another FRM containing the fibrous material according to the invention.
Figure 8:
FIG. 8 is an Auger electron micrograph indicating the presence of Al in the FRM in FIG. 7.
Figure 9:
FIG. 9 is an Auger electron micrograph indicating the presence of Cu in the FRM in FIG. 7.
Figure 10:
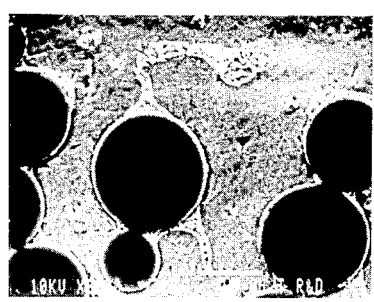
FIG. 10 is an Auger electron micrograph showing the structure of a conventional FRM.
Figure 11:
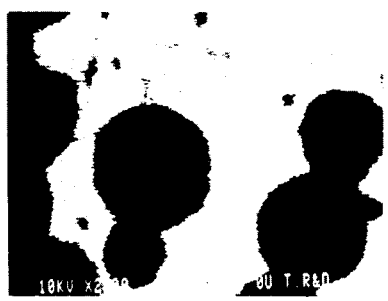
FIG. 11 is an Auger electron micrograph indicating the presence of Al in the conventional FRM in FIG. 10.
Figure 12:
FIG. 12 is an electron micrograph indicating the presence of Cu in the FRM in FIG. 10.

FIGS. 7 through 12 show the results of an elementary analysis of the cross section of a FRM containing the fibrous material for composite material according to this invention and a conventional FRM. FIG. 7 is an electron micrograph of a section perpendicular to the continuous fibers of the FRM according to the invention, while FIG. 8 shows the result of an analysis of Al as the matrix metal in FIG. 7, in which the white portion indicates Al. FIG. 9 shows the result of an analysis of Cu, which is the additive element in FIG. 7, in which the white region indicates Cu. FIG. 10 is an electron micrograph of a section perpendicular to the continuous fibers of a conventional FRM. FIGS. 11 and 12 show the results of analyses of Al and Cu in FIG. 10, respectively, in which the white region indicates Al and Cu, respectively.

In the FRM containing the fibrous material according to the invention, the additive element Cu is concentrated at the periphery of the whiskers and/or short fibers as shown in FIG. 9 in the course of the coagulation, and microsegregation of the additive elements as shown in FIG. 12 is decreased at the surface of the continuous fibers. Accordingly, since compounds containing these elements are prevented from growing coarsely on the continuous fiber surfaces and the brittle phase joining the fibers to each other is decreased, the theoretical strength of the material can be attained.

Result of Comparative Performance Tests

Table 2 below shows the bending strength for a number of FRM composite materials using the inorganic fiber (I) and carbon fibers (HM 35) (described above) as the continuous fibers. FRM's manufactured using only the continuous fibers (comparative materials 1 and 4) had low values in comparison with the ROM values. A remarkable improvement in strength was observed in FRM's containing either fine particles or whiskers (Reference materials 2, 3 and 5, 6 of the invention). However, the bending strengths of the invention FRM's containing both fine particles and whiskers (materials 3 and 4 of the invention) were identical with the ROM values, showing the excellent mechanical properties of the FRM's containing the fibrous material according to the invention as compared with conventional FRM's.

TABLE 2

| | Bending Strength of FRM Composites | | |
|---|---|---|---|
| | FRM Composition | Bending strength (GPa) | ROM [1] value (GPa) |
| Comparative material 1 | 60% Fiber (I)[4]/Al-4.5% Cu | 0.4 | 1.4 |
| Reference material 2 of the invention | 55% Fiber (I) + SiC(p)/[2] Al-4.5% Cu | 0.8 | 1.3 |
| Reference material 3 of the invention | 50% Fiber (I) + SiC(w)/[3] Al-4.5% Cu | 0.7 | 1.2 |
| Material 3 of the invention | 45% Fiber (I) + SiC(p) + SiC(w)/Al-4.5% Cu | 1.1 | 1.1 |
| Reference material 4 of the invention | 70% HM35/Al-5% Mg | 1.4 | 1.8 |
| Reference material 5 of the invention | 60% HM35 + SiC(p)/ Al-5% Mg | 1.3 | 1.6 |

TABLE 2-continued

| | Bending Strength of FRM Composites | | |
|---|---|---|---|
| | FRM Composition | Bending strength (GPa) | ROM [1] value (GPa) |
| Reference material 6 of the invention | 50% HM35 + SiC(w)/Al-5% Mg | 1.0 | 1.3 |
| Material 4 of the invention | 50% HM35 + SiC(P) + SiC(w)/Al-5% Mg | 1.3 | 1.3 |

[1] ROM value: calculated value determined from the tensile strength
[2] p indicates fine particles
[3] w indicates whiskers
[4] Fiber (I) indicates the inorganic fiber (I)

EXAMPLE 7

After charging 100 g of silicon carbide whiskers (0.2 μm) in average diameter and 100 μm in average length) and 250 g of silicon carbide particles (0.28 μm in average grain size) into a processing bath containing 5 liters of ethanol, ultrasonic sound (28 Hz) was applied by an ultrasonic source to suspend them, to prepare a processing solution. Continuous silicon carbide fibers having a 13 μm fiber diameter, a 300 kg/mm² tensile strength and a 16 t/mm² tensile modulus were unwound from a bobbin and immersed and passed through the processing solution while controlling the dipping time to 15 seconds by using movable rollers. During processing, air was blown into the processing solution to agitate the bath, in addition to the ultrasonic sound. Then, after pressing by press rollers, the fibers were wound up to a bobbin and dried at room temperature in atmospheric air.

The continuous fibers, which had been black before processing, became grey-green after processing and, by microscopic observation, it was determined that silicon carbide particles were mainly deposited on the surface of the continuous fibers and silicon carbide whiskers were mainly deposited on the outside thereof. Further, the silicon carbide particles and the whiskers deposited had a combined volume of 10% of the volume of the continuous fibers and the volume fraction of particles to whiskers was 3:1.

The thus-treated bundle of fibers was cut into 150 mm lengths, and 50 such bundles were inserted side-by-side into a pipe made of steel. The pipe was pre-heated to 760° C. in a nitrogen gas atmosphere and placed in a molding die, after which pure molten aluminum heated to 760° C. was poured into the fiber mass and it was pressed using a punch at 1,000 kg/cm² for 60 seconds to produce on inorganic fiber-reinforced composite metal material according to the invention.

Figure 13:
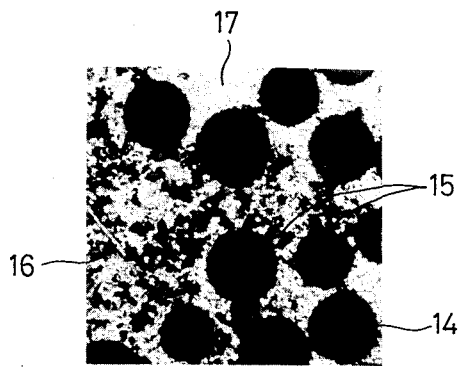
FIG. 13 is an electron micrograph showing the micro-structure of a fiber-reinforced composite metal material according to the invention.

Upon examining a cross section of the microsurface perpendicular to the axis of the continuous fibers using a scanning electron microscope (as shown in FIG. 13), it was seen that the fine particles 15 of silicon carbide were present uniformly at the surfaces of the continuous fibers 14, that whiskers 16 of silicon carbide were situated on the outside thereof, there was no contact between the continuous fibers and that they were uniformly dispersed in the matrix metal 17.

The tensile strength of the composite material was 95 kg/mm², which was outstanding compared with the tensile strength of 37 kg/mm² of the composite metal material reinforce with untreated silicon carbide fibers.

EXAMPLE 8

An inorganic fiber-reinforced composite metal material was produced by repeating the same procedure as in Example 7, except for using the inorganic fibers (I) instead of continuous fibers of silicon carbide.

Upon observing a cross section of the microstructure perpendicular to the axis of the continuous fibers using a scanning electron microscope, it was recognized that fine particles of silicon carbide were uniformly present at the surfaces of the continuous fibers, that whiskers of silicon carbide were situated on the outside thereof, there was no contact between the continuous fibers, and that the fibers were uniformly dispersed in the matrix metal, closely resembling the structure obtained in Example 7 and shown in FIG. 13.

The tensile strength of the resultant composite metal material was 120 kg/mm², which was substantially equal to the theoretical value.

EXAMPLE 9

The polytitanocarbosilane fibers obtained in the same manner as in Example 1 were heated from room temperature at a rate of temperature increase of 7.5° C./hr without applying tension in air, and were maintained at 175° C. for two hours to be cured. The cured yarn had a tensile strength of 6.0 kg/mm² and an elongation of 21.0%.

Then, the cured yarn was heat-treated in a nitrogen gas stream (100 cc/min) without applying tension up to 1,200° C. for 12 hours and maintaining at 1,200° C. for one hour. The resultant continuous fiber (hereinafter referred to as the inorganic fiber (III)) had a diameter of about 12 μm, a tensile strength as measured by the monofilament method of 250 kg/mm² and a modulus of elasticity of 14.0 t/mm².

An FRM according to the invention (Material 5) shown in the following Table 3 was obtained by the same process as in Example 6, using the inorganic fibers manufactured by the method described above.

Figure 14:
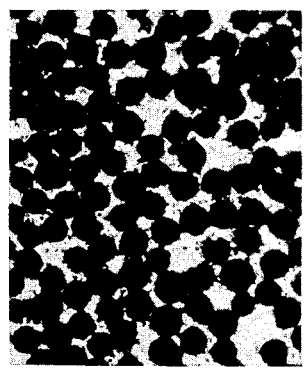
FIG. 14 is an electron micrograph depicting the micro-structure of a comparison fiber-reinforced composite metal material.

FIG. 14 is a cross sectional view of material 5 according to the invention (factor : 400×).

COMPARATIVE EXAMPLES 1 AND 2

Figure 15:
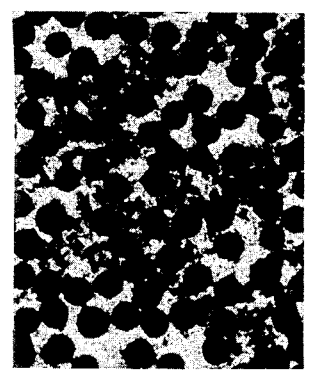
FIG. 15 is an electron micrograph illustrating the micro-structure of another fiber-reinforced composite metal material according to the invention.

The comparison FRM specimens shown in Table 3 below were obtained by the same process as in Example 8 except for using only the inorganic fibers (III) obtained in Example 9 as the reinforcing material (Comparative Material 7) and using the inorganic fibers (III) and fine powders of silicon carbide as the reinforcing material (Reference Material 8 of the invention). A cross sectional view of the reference material 8 is shown in FIG. 15 (Factor 400×).

TABLE 3

| | Bending strength of FRM Composites | |
|---|---|---|
| | Composition of FRM | Bending strength (GPa) |
| Reference material 7 of the invention | 60% Fiber (III)[3]/Al-4.5% Cu | 0.4 |
| Reference material 8 of the invention | 55% Fiber (III) + SiC(p)/[1] Al-4.5% Cu | 0.8 |
| Material 5 of the invention | 45% Fiber (III) + SiC(p) + SiC(w)[2]/Al-4.5% Cu | 1.1 |

[1] p means fine particles
[2] w means whiskers
[3] Fiber (III) means the inorganic fiber (III)

As is apparent from Table 3 above, the FRM according to the invention has a large bending strength and excellent mechanical strength as compared with the conventional FRM.

EXAMPLE 10

The continuous fibrous material deposited with fine particles and whiskers manufactured in Example 8 was oriented monoaxially, impregnated with a commercially available bisphenol A type epoxy resin and subjected to preliminary curing to obtain a prepreg 0.1 mm thick. After laminating 25 prepregs, they were hot pressed at 170° C. under 7 kg/cm$^2$ for 4 hours to obtain a composite material 2 mm thick.

Upon examining a cross section of the composite material using a scanning electron microscope, it was confirmed that particles of silicon carbide were deposited to the boundary of the inorganic fibers, that the inorganic fibers were uniformly dispersed in the matrix, and that there was no contact between the fibers. The silicon carbide whiskers were dispersed between the fibers.

The fiber content in the composite material was 55% by volume. The composite material had a tensile strength of 160 kg/mm$^2$ and an interlayer shearing strength of 12.3 kg/mm$^2$.

EXAMPLE 11

The same procedures as in Example 10 were repeated except that the inorganic fibers (II) was used instead of the inorganic fibers (III) used in Example 10. The composite material obtained had a tensile strength of 180 kg/mm$^2$ and an interlayer shering strength of 12.4 kg/mm$^2$.

EXAMPLE 12

The same continuous fibrous material as in Example 3 was oriented in a sheet-like manner in one direction, impregnated with a commercially available phenol novolak type modified epoxy resin and subjected to preliminary curing to obtain a prepreg sheet 0.15 mm thick. After laminating 18 sheets, they were hot pressed at 170° C. under 71 kg/cm$^2$ for 4 hours to obtain a laminate 2 mm thick.

Upon examining a cross section of the composite material by using a scanning electronic microscope, it was found that the silicon carbide particles were deposited to the surface of the inorganic fibers, that the inorganic fibers were uniformly dispersed in the matrix, and that there was no contact between the fibers. Further, it was confirmed that the silicon carbide whiskers were dispersed between the fibers.

The fiber content in the composite material was 55% by volume. The composite material had a tensile strength of 178 kg/mm$^2$ and an interlayer shearing strength of 12.6 kg/mm$^2$.

Based on the electron micrograph, it was considered that the gap between the continuous fibers in the FRP was properly maintained due to the deposition of the fine particles and the position of the whiskers to the outside thereof, resulting in more uniform dispersion of the continuous fibers in the matrix plastic and decreased contact between the fibers, in comparison with a fiber-matrix composite without particles or whiskers.

In an FRP in which only fine particles were added for reinforcement to the continuous fibers, although the fiber gaps were increased, there was no substantial reinforcing effect in the direction perpendicular to the fiber axis. Further, when an FRP was reinforced by adding only whiskers or short fibers to the continuous fibers, it was difficult to widen the fiber gaps and no substantial reinforcing effect was obtained either in the axial direction of the fibers or in the direction perpendicular to the fiber axis.

EXAMPLE 13

Sheet-like products prepared by monoaxially orientating the same continuous fibrous material as in Example 8 and an silicon nitride powder prepared by mixing 2% by weight of alumina, 3% by weight of yttria and 3% by weight of aluminum nitride (average grain size : 0.5 $\mu$m) were laminated alternately such that the fibers of the fiber bundles extended into the adjacent layers. The lamination product was hot pressed at 1,750° C., 300 kg/cm$^2$ for 30 minutes to obtain a sintered composite product of inorganic fiber-reinforced silicon nitride.

The fiber content of the composite sintered product was 10% by weight. Upon examining a cross section of the composite material by using a scanning electron microscope, it was found that the reinforcement fibers were dispersed in the silicon nitride as the matrix without contacting each other. The flexural strength of the composite material at room temperature was 128 kg/mm$^2$, while its flexural strength at 1,300° C. was 68 kg/mm$^2$.

The flexural strength at room temperature of a composite material obtained in the same manner except for omitting the silicon carbide whiskers and the silicon carbide particles was 97 kg/mm$^2$.

Upon examining the cross section of the FRC according to the invention by using an electron microscope, It was considered that since the fiber gap was maintained adequately by the deposition of the fine particles on the continuous fibers and the whiskers on the outside thereof, the fibers were uniformly dispersed in the matrix ceramic and the contact between the fibers was decreased as compared with an FRC without particles or whiskers.

In the case of an FRC reinforced by adding only the fine particles to the continuous fibers, although the fiber gap was increased, the reinforcing effect in the direction perpendicular to the fibers were relatively low. Further, in the case of an FRC reinforced by adding only the whiskers or short fibers to the continuous fibers, it was difficult to widen the fiber gap, and the reinforcing effect in the axial direction of the fibers and that in the direction perpendicular to the fibers were relatively low.

The results obtained in the above Examples demonstrate that because of the short fibers, whiskers or fine particles deposited on the continuous inorganic fibers according to the invention, each of the continuous inorganic fibers can be dispersed uniformly in a composite material, and that the fiber volume fraction can be controlled within a wide range. Further, since various combinations are possible for the continuous fibers and the short fibers, whiskers or fine particles, any desired properties over a wide range easily can be satisfied. Since the contact between each of the continuous fibers is decreased and the composition of the composite material is uniform, its strength in the direction perpendicular to the axis of the continuous fibers is significantly improved.

When using the specific continuous inorganic fibers according to the invention composed of Si, C, O and either Ti or Zr, remarkably improved $\sigma_L$ in FRM materials, superior fatigue strength in FRP material sand improved the heat resistance in FRC materials are obtained in comparison with conventional continuous fibers.

In the fibrous material according to the invention composed of a bundle of continuous fibers in which fine particles, and short fibers and/or whiskers are deposited on the surface of individual continuous fibers, the continuous fibers can be dispersed uniformly in a composite material, thereby controlling the volume fraction of the fibers within an extremely broad range. Further, since contact between each of the continuous fibers is decreased and the composition of the composite material when formed is uniform, its mechanical properties such as strength can also be improved.

This improvement is increased when fine particles are mainly deposited on the surface of individual continuous fibers and short fibers and/or whiskers are mainly deposited on the outside of the fine particles.

Continuous fibers, a bundle thereof or woven fabrics made therefrom can be dipped in a processing solution containing the fine particles, short fibers or whiskers suspended therein, for example, by unwinding or winding means, providing a process for producing fibrous material according to the invention that is convenient and highly efficient. The application of ultrasonic sound waves to the processing solution facilities the dispersion of fine particles, whiskers and short fibers into the bundle of continuous fibers or the fabrics made therefrom. Furthermore, various modifications, including the use of an organic solvent as the processing liquid, are possible, to permit control of the amount deposited and to allow various fibrous materials to be manufactured using identical equipment.

In the inorganic fiber-reinforced composite metal material according to the invention, the inorganic fiber-reinforced composite plastic material according to the invention and the inorganic fiber-reinforced composite ceramic material according to the invention, since the matrix metals are reinforced with a bundle of continuous fibers or a woven fabric made of such bundles in which fine particles, and short fibers and/or whiskers are deposited on the surface of individual continuous fibers, the continuous fibers can uniformly be dispersed in the composite material thereby permitting control of the fiber volume fraction within an extremely wide range. Also, since contact between each of the continuous fibers is decreased and the composition of the composite material is uniform, its mechanical properties such as strength can be improved. These advantages can be increased by depositing predominantly fine particles on the surface of the individual continuous fibers and depositing predominantly short fibers and/or whiskers on the outside thereof.

In conventional fiber-reinforced composite materials, if the fiber content is low, the fibers tend to be aggregated and it is therefore difficult to obtain the theoretical strength expected for such a composite structure. However, in the composite materials according to the invention, the continuous fibers are dispersed extremely uniformly in the matrix even if the fiber content is low and the theoretical strength can be achieved, thus greatly improving the degree of design freedom.

Further, in the composite materials according to the invention various combinations are possible of continuous heat-resistant fibers, fine particles, and short fibers and/or whiskers made of heat resistant material, as well as matrixes, permitting any desired properties over a wide range to be attained.

While the invention has been described in detail and with reference to specific examples thereof, it will be apparent to one skilled in the art that various changes and modifications can be made therein without departing from the spirit and scope thereof.

What is claimed is:

1. A fibrous material for a composite material comprising a bundle of continuous fibers or a woven fabric comprising a plurality of said bundles of continuous fibers, said continuous fibers comprising at least one material selected from the group consisting of a ceramic, carbon and a metal, in which fine particles, and at least one of short fibers and whiskers each comprising at least one heat resistant material selected from the group consisting of a ceramic, carbon and a metal, are contacted with the surface of said continuous fibers.

2. The fibrous material for a composite material as claimed in claim 1, wherein said fine particles are mainly deposited on the surface of the continuous fibers and said at least one of short fibers and whiskers are mainly deposited on the outside of said fine particles.

3. The fibrous material for a composite material as claimed in claim 1, wherein about 80% of said fine particles are deposited on the surface of said continuous fibers and about 80% of said at least one of short fibers and whiskers are deposited on the outside of said fine particles.

4. The fibrous material for a composite material as claimed in claim 1, wherein the average grain size of the fine particles is less than about 1/30 of the average length of the short fibers or whiskers.

5. The fibrous material for a composite material as claimed in claim 1, wherein the ceramic comprises at least one member selected from the group consisting of carbides, nitrides, borides and oxides.

6. The fibrous material for a composite material as claimed in claim 1, wherein the ceramic comprises:
   (i) an amorphous material substantially comprising Si, M, C and O;
   (ii) a composition substantially comprising: at least one crystalline particles mixture selected from
       (a) $\beta$-SiC, MC and a solid solution of $\beta$-SiC and MC,
       (b) $\beta$-SiC, MC and $MC_{1-x}$, and
       (c) $\beta$-SiC, MC, a solid solution of $\beta$-SiC and MC, and $MC_{1-x}$, each having a grain size of less than about 500 Å; amorphous $SiO_2$; and amorphous $MO_2$; and
   (iii) a mixture of said amorphous material (i) and said composition (ii) wherein M represents Ti or Zr, and x is a number greater than 0 and smaller than 1.

7. The fibrous material for a composite material as claimed in claim 1, wherein the ratio of said fine particles to said at least one of short fibers and whiskers is within the range of from 0.1:5 to 40:1 by volume ratio.

8. The fibrous material for a composite material as claimed in claim 1, wherein said fine particles have an average diameter of about 1/5,000 to ½ of the average diameter of the continuous fibers.

9. The fibrous material for a composite material as claimed in claim 1, wherein said short fibers and whiskers have an average diameter of about 1/3,000 to 1/5 of the average diameter of the continuous fibers and a length to diameter ratio of from about 50 to 1000.

10. The fibrous material for a composite material as claimed in claim 1, wherein said continuous fibers comprise at least one of ceramics and non-metal elements.

11. The fibrous material for a composite material as claimed in claim 1, wherein said continuous fibers have said fine particles and whiskers contacting the surface thereof.

12. The fibrous material for a composite material as claimed in claim 11, wherein the fibrous material is a woven fabric comprising a plurality of continuous fibers.

13. The fibrous material for a composite material as claimed in claim 1, wherein the fibrous material is a bundle of continuous fibers.

14. The fibrous material of claim 1, wherein spaces within said fibrous material are filled with a metal or form a fiber-reinforced metal.

* * * * *